W. G. FLANDERS.
STEAM COOKING-KETTLE.
No. 183,554. Patented Oct. 24, 1876.
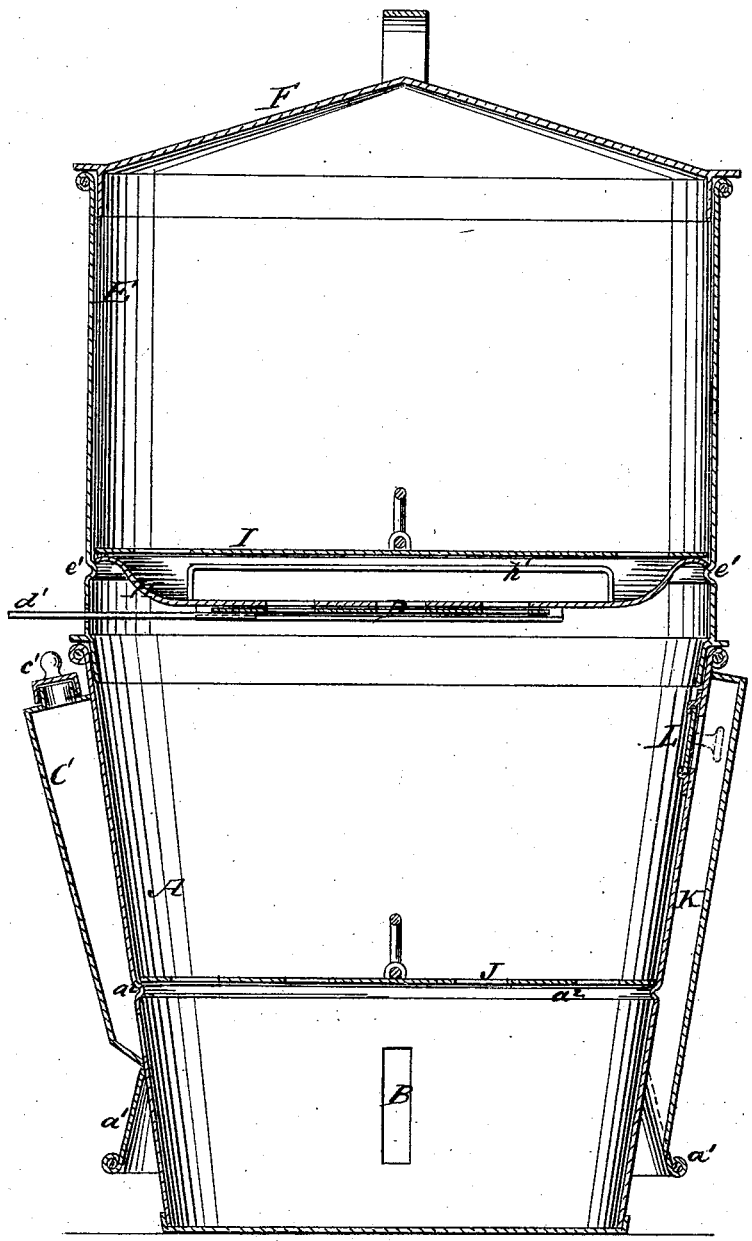
WITNESSES:
E. Wolff
John Goethals
INVENTOR:
Wm. G. Flanders
BY Munn & Co
ATTORNEYS.

UNITED STATES PATENT OFFICE.

WILLIAM G. FLANDERS, OF WEST LEBANON, NEW HAMPSHIRE.

IMPROVEMENT IN STEAM-COOKING KETTLES.

Specification forming part of Letters Patent No. 183,554, dated October 24, 1876; application filed August 14, 1876.

*To all whom it may concern:*

Be it known that I, WILLIAM GATES FLANDERS, of West Lebanon, in the county of Grafton and State of New Hampshire, have invented a new and useful Improvement in Steam-Cooking Kettle, of which the following is a specification:

The figure is a vertical section of my improved steam-cooking kettle.

The object of this invention is to furnish an improved utensil for cooking food by steam, which shall be so constructed as to enable large or small articles to be cooked, or several articles to be cooked, at the same time; which will enable articles in one part to be inspected, put in, and taken out without disturbing the articles in the other part.

The invention will first be fully described in connection with the drawing, and then pointed out in the claim.

A is the main or lower part of the utensil, which is made with its lower end somewhat smaller than the boiler-hole in which it is to be placed, and with an outwardly-inclined flange, $a^1$, around it, to rest upon the top of the stove or range around said boiler-hole. In the sides of the part A, below its center, is formed an inwardly-projecting bead, $a^2$, to receive the perforated plate J, upon which the food is placed to be steamed. In the side of the part A, near its bottom, is formed a slot or sight-hole, B, in which is secured a glass plate, to enable the cook at any time to see how much water there may be in the utensil, so that the water may be replenished when necessary, to prevent the kettle from boiling dry. To the side of the kettle A is attached a tube, C, the lower end of which communicates with the interior of said kettle through a hole in its side. The upper end of the tube C extends to, or nearly to, the top of the said part A, and is provided with a closely-fitting cap, $c^1$, to prevent steam from escaping through said tube. The tube C enables the kettle to be conveniently supplied with water when required. To the side of the kettle A is secured a tube, K, the lower end of which passes down through the flange $a^1$, and opens into the space beneath said flange.

The upper end of the tube K communicates with the interior of the kettle A through a hole in the upper part of its side, which hole is covered by a slide, L, placed upon the inner surface of the said kettle A, working sidewise in grooved strips attached to said side, and operated by a knob, the stem of which passes in through a slot in the side of the kettle A, the slide L being made long enough to keep the said slot always covered.

The slide L enables the steam-pressure within the kettle to be controlled as desired, the surplus steam being allowed to pass off into the stove, carrying with it any odor that might otherwise escape into the room.

E is the upper or extension part of the kettle, the lower end of which is so formed as to fit steam-tight in the mouth of the lower or main part A. The extension E is provided with an inwardly-projecting bead, $e'$, near its lower end, to receive the detachable bottom H and the perforated plate I, upon which the articles are placed to be steamed. The middle part of the bottom H is concaved, and has slots or holes formed through it for the passage of the steam, and is provided with a sliding damper, D, to enable the size of said openings to be adjusted as required, or to be entirely closed when desired.

By this arrangement more or less steam may be admitted into the extension E, to cause the articles in said extension to cook faster or slower, as may be desired; or the steam may be entirely shut off, to enable articles to be taken out of and put into the extension E without being disturbed by the steam, or allowing the steam to escape into the room, or interfering with the cooking going on in the lower part A of the kettle.

The detachable bottom H is provided with a handle, $h'$, to enable it to be conveniently taken out and put in, so that, by taking out the perforated plate I and the bottom H, larger articles can be cooked than can be put into either part alone. The damper D is operated by a bar, $d^1$, passing out through a hole in the side of the extension E, and which may have a detachable handle attached to its outer end, if desired.

F is a cover, which is so formed as to fit into the mouth of the extension E, or of the main part A of the kettle, as may be required.

Having thus described my invention, I claim as new and desire to secure by Letters Patent—

The double-chambered culinary vessel, made in detachable parts A E, each provided with a perforated diaphragm, and the upper part E having a bottom, H, provided with a slide for closing the apertures therein, as shown and described, for the purpose specified.

WILLIAM GATES FLANDERS.

Witnesses:
W. P. BURTON,
E. H. BAGLEY.